Dec. 22, 1970  C. S. BENZ  3,549,742
METHOD OF MAKING A FORAMINOUS DRAINAGE MEMBER
Filed Sept. 29, 1967  7 Sheets-Sheet 1

INVENTOR.
CHARLES S. BENZ
BY
ATTORNEY.

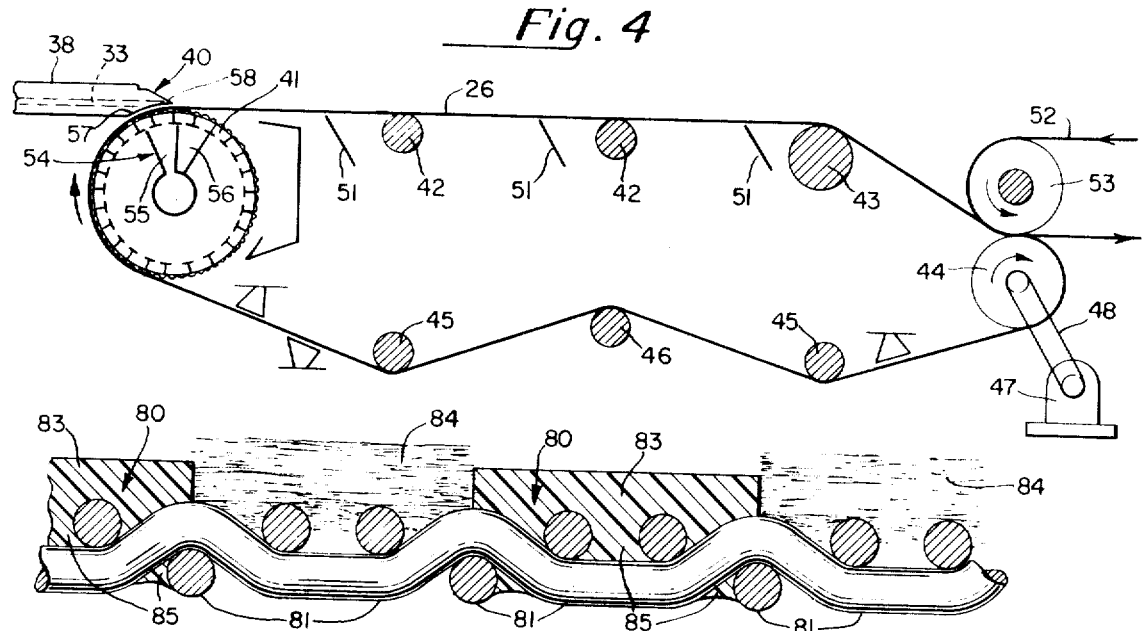
Fig. 4
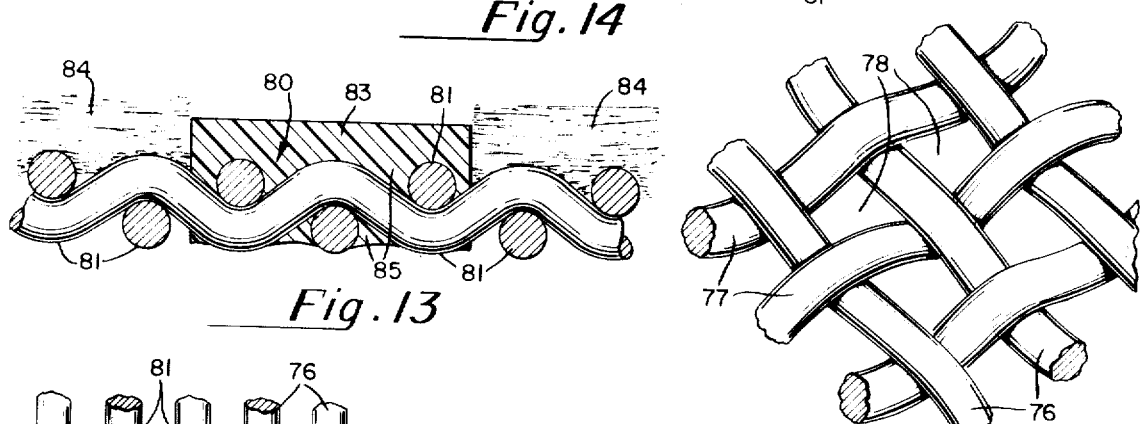
Fig. 14
Fig. 13
Fig. 10
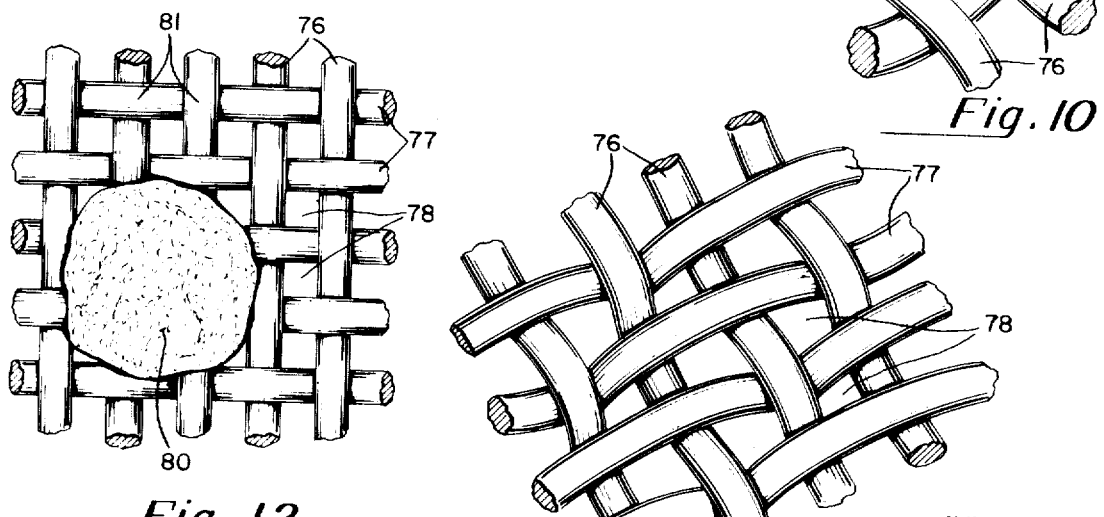
Fig. 12
Fig. 11
INVENTOR.
CHARLES S. BENZ
BY
ATTORNEY.

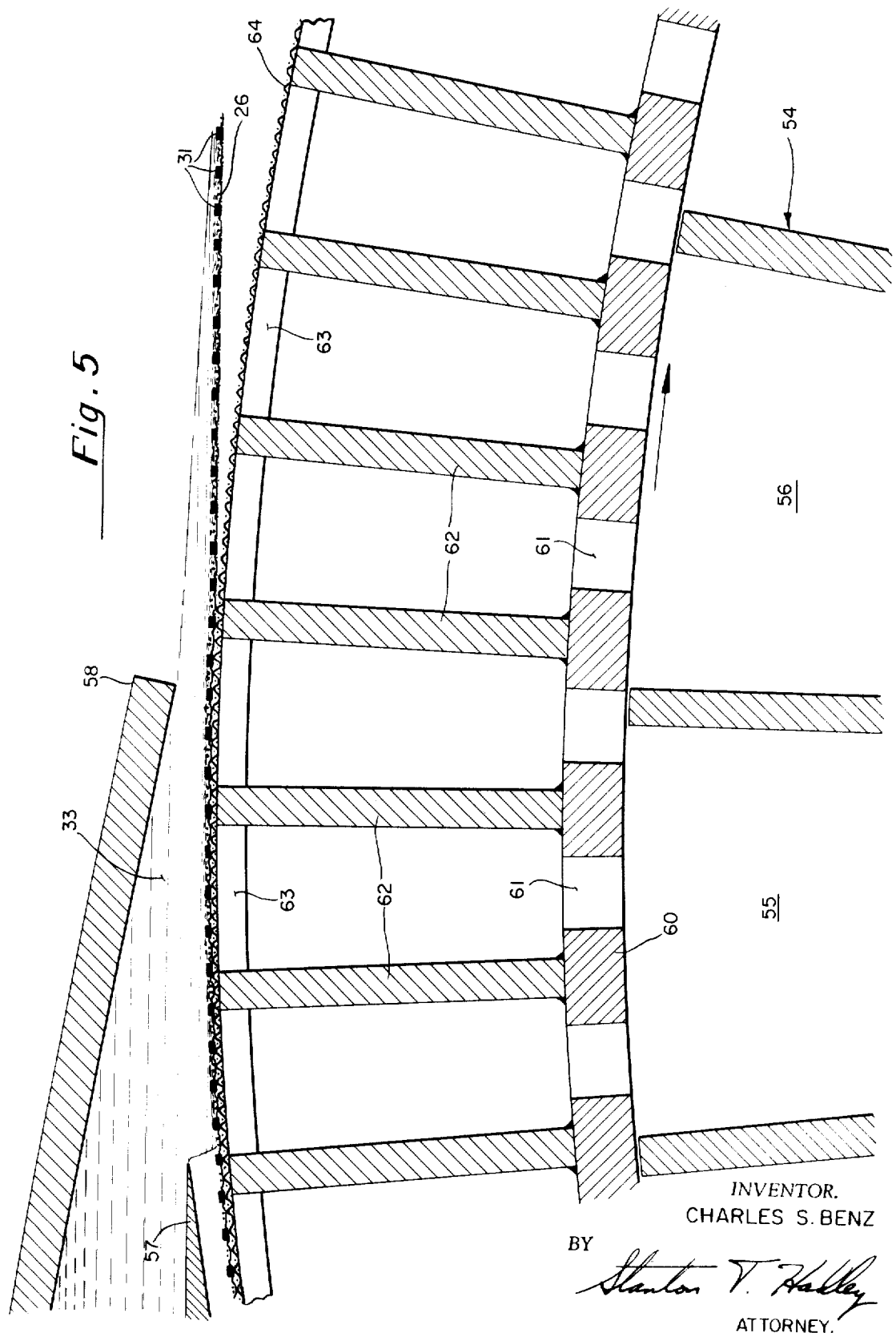

Dec. 22, 1970     C. S. BENZ     3,549,742
METHOD OF MAKING A FORAMINOUS DRAINAGE MEMBER
Filed Sept. 29, 1967                      7 Sheets-Sheet 4
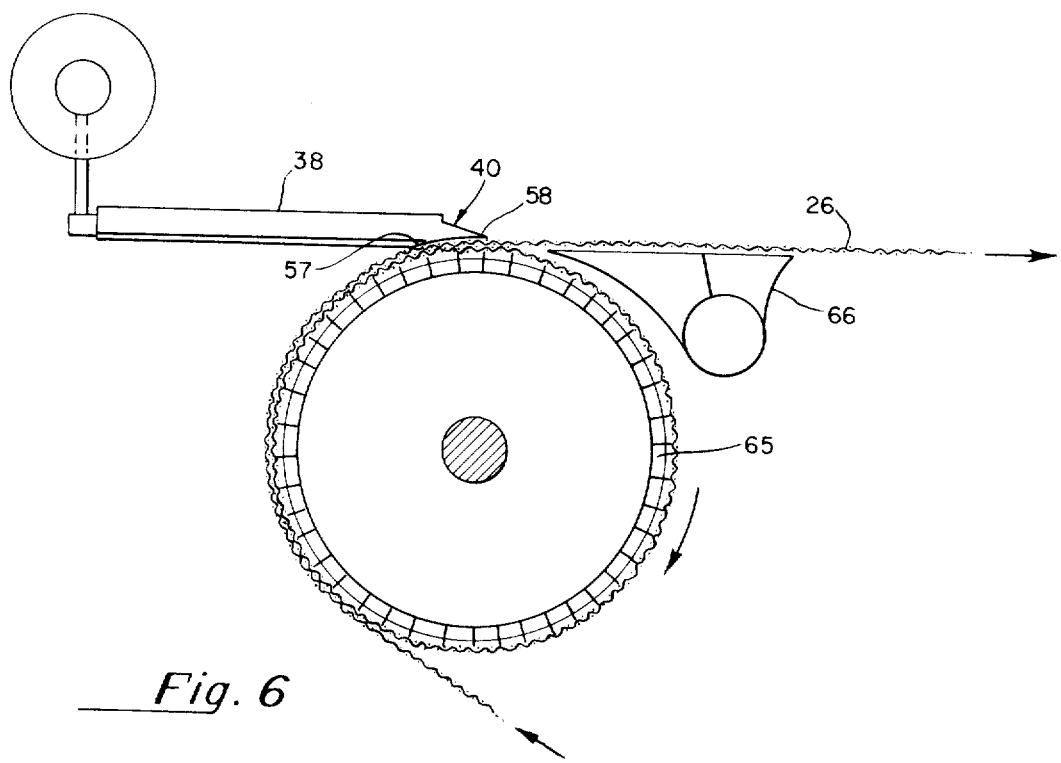
Fig. 6
Fig. 7
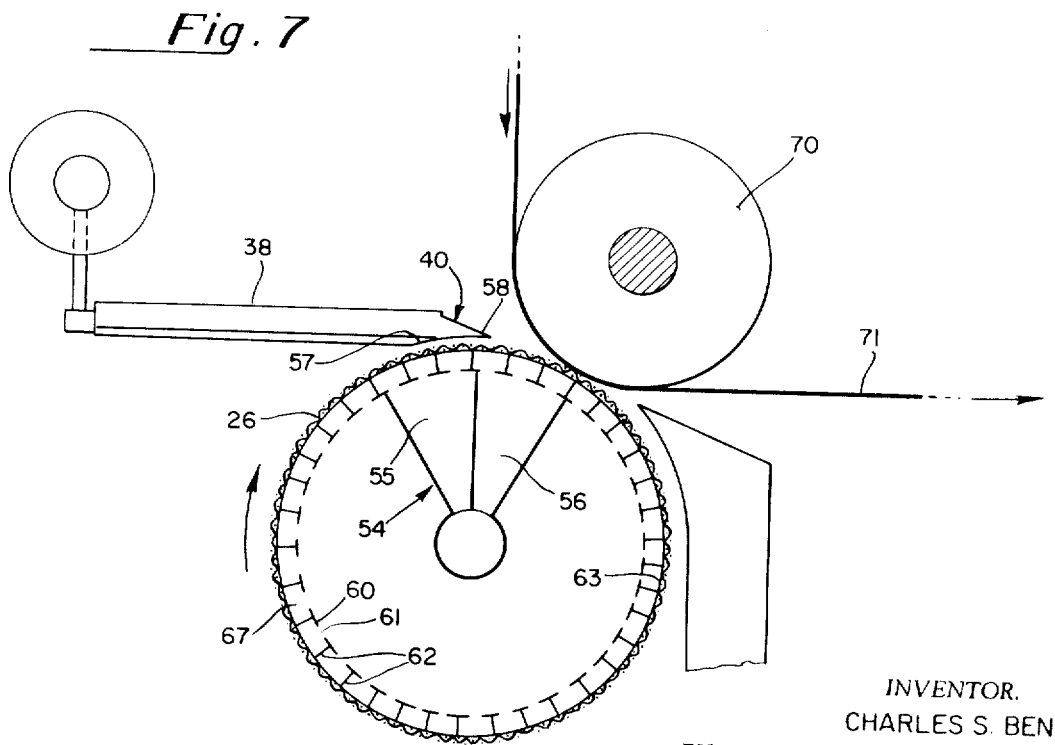
INVENTOR.
CHARLES S. BENZ
BY
ATTORNEY.

Dec. 22, 1970  C. S. BENZ  3,549,742
METHOD OF MAKING A FORAMINOUS DRAINAGE MEMBER
Filed Sept. 29, 1967  7 Sheets-Sheet 6

INVENTOR.
CHARLES S. BENZ
BY
ATTORNEY.

United States Patent Office 3,549,742
Patented Dec. 22, 1970

3,549,742
METHOD OF MAKING A FORAMINOUS
DRAINAGE MEMBER
Charles S. Benz, Glen Mills, Pa., assignor to Scott Paper
Company, Delaware County, Pa., a corporation of
Pennsylvania
Filed Sept. 29, 1967, Ser. No. 671,800
Int. Cl. B29d 29/00
U.S. Cl. 264—250
12 Claims

ABSTRACT OF THE DISCLOSURE

A foraminous beltlike structure is disclosed for use as a drainage member in the method and apparatus for forming apertured fibrous webs. The foraminous beltlike structure comprises a drainage member having a plurality of apertures substantially uniformly disbursed throughout, and flow control means, which in some instances comprise bodies of settable material, connected to the drainage member in a manner which prevents flow of liquid through the apertures in predetermined areas of the drainage member, the number of these predetermined areas being from about 100 to about 1300 per square inch of said member.

A method is disclosed for preparing the above-described foraminous beltlike structure including inserting filling material into apertures in the drainage member which will ultimately be open for drainage after which a settable material is inserted into the remaining apertures of the drainage member in the predetermined areas in which flow of liquid through the drainage member is to be prevented. The settable material is fixed or cured depending upon its composition, after which the filling material is removed from the drainage member, leaving the desired foraminonus beltlike structure.

BACKGROUND OF THE INVENTION

(1) Field of the invention

The present invention relates to the manufacture of fibrous webs and, more particularly, to fibrous webs having a predetermined pattern of apertures or areas of differential basis weight, the number of which apertures or areas is from about 100 to about 1300 per square inch of web.

Other aspects of the invention relate to a method and apparatus for forming the above-described fibrous webs and, more particularly, to a method and apparatus based on wet laying principles. The method of the invention may be performed on a modified papermaking machine. Embodiments of the apparatus comprise modified papermaking machines including as an element thereof a foraminous beltlike structure of the invention which serves as a drainage member in the method and apparatus of the invention.

Still further aspects of the invention relate to a foraminous beltlike structure suitable for use in the above-described method and apparatus for forming the above-described fibrous webs. Another aspect of the invention relates to a method of preparing the foraminous beltlike structures described above.

(2) Description of the prior art

Early in the art of papermaking, it was recognized that fibrous webs having areas of differential basis weight or apertures therethrough would not only be attractive for a variety of uses but would also perform new functions such as filtering of materials. Possible applications of such products have been even more apparent with the advent of fibrous webs having considerable wet strength, made possible by the inclusion of wet strength agents in the fiber furnish or by the application of wet strength agents to the web after formation.

The earliest record of related work in this country is believed to be U.S. Pat. No. 795,719, issued July 25, 1905, to F. J. Motz. For reasons which will become apparent from subsequent description, it is believed that the apparatus and process described by Motz was never operable, at least in a practical sense. Other work, some of which perhaps preceded the work by Motz, has been carried on chiefly in the field of nonwoven fibrous webs in which relatively long fibers, generally greater than ¼ inch in length, were formed into a web and rearranged during the formation of the web or after the formation of the web to create apertures in the resulting web.

The methods for rearranging the fibers include forming them into a web on a modified drainage surface which causes the formation of apertures therein as described in the Motz patent, applying fluid streams of liquid or gas to the wet web during or after its formation, punching holes in the wet web during or immediately after its formation and working the fibers in the web after its formation, all of the above being capable of creating apertures in nonwoven fibrous webs. Early Japanese methods for forming handmade apertured fibrous webs of paper fibers involve the dripping of liquid onto predetermined areas of the web fibrous webs for a period of time to rearrange the fibers in localized areas, thereby forming apertures. This latter method is disclosed in a reference publication entitled "Handmade Papers of Japan," T. K. and H. R. Tindale, published by Charles E. Tuttle Company, Rutland, Vermont, and printed in Tokyo, Japan, in 1952.

When the above-described processes are applied to the papermaking art in which fibers of a generally shorter length, less than about ¼ inch, are used, serious problems and limitations become apparent. For example, not only is the apparatus quite complicated in construction and operation, but also the speed of web formation and treatment is quite low. In addition, the variation in the structure of fibrous webs formed of fibers of nonwoven length, generally greater than ¼ inch, is seriously limited. For example, the number of apertures per unit area of the web is normally quite low while the minimum size of such apertures which can be formed in the webs is quite high. Furthermore, flexibility in changing patterns is limited.

References disclosing prior art methods for creating apertures in fibrous webs by punching or mechanically rearranging the fibers in the web include U.S. Pat. No. 3,074,303, issued Jan. 22, 1963, to J. W. Waters; U.S. Pat. No. 3,081,501, issued March 19, 1963, to F. Kalwaites; U.S. Pat. No. 3,104,998, issued Sept. 21, 1963, to K. A. Gelpke; U.S. Pat. No 3,137,893, issued June 23, 1964, to K. A. Gelpke; U.S. Pat. No. 3,012,290, issued Dec. 12, 1961, to C. Harmon et al.; and U.S. Pat. No. 3,025,585, issued Mar. 20, 1962, to H. W. Griswold. The last-named patent combines the use of tapered prongs in the Fourdrinier wire with the application of a liquid spray to rearrange the fibers in the web.

References disclosing processes for creating apertures in fibrous webs by spraying fluids against the previously formed web in a pattern include U.S. Pat. No. 3,081,500, issued Mar. 19, 1963, to H. W. Griswold et al.; U.S. Pat. No. 3,068,547, issued Dec. 18, 1962, to P. D L'Hommedieu; U.S. Pat. No. 3,042,576, issued July 3, 1962, to C. Harmon et al.; U.S. Pat. No. 3,088,859, issued May 7, 1963, to J. H. Smith; and U.S. Pat. No. 2,862,251, issued Dec. 2, 1958, to F. Kalwaites.

References disclosing the use of mechanical working of a fibrous web to form apertures therein include U.S.

Pat. No. 3,081,512, issued Mar. 19, 1963, to H. W. Griswold, in which the web is passed betwen the nip formed by two axially and circumferentially oscillated rolls, and U.S. Pat. No. 3,150,416, issued Sept. 29, 1964, to J. J. Such, in which apertures are formed in a fibrous nonwoven web by the action of two specially designed embossing rolls.

References employing prongs or projections extending above the upper surface of the Fourdrinier wire for controlling web formation, in addition to U.S. Pat. No. 3,025,585 mentioned above, include U.S. Pat. No. 3,034,180, issued May 15, 1962, to C. J. Greiner et al., and the above-referenced patent to Motz. U.S. Pat. No. 3,159,530, issued Dec. 1, 1964, to H. H. Heller et al., and U.S. Pat. No. 1,699,760, issued Jan. 22, 1929, to J. C. Sherman disclose the formation of modified Fourdrinier wires having a different weave or members incorporated in the weave for controlling the formation of apertures in fibrous webs.

References, in addition to the above, which disclose apertured fibrous webs include U.S. Pats. Nos. 3,081,514 and 3,081,515, both issued Mar. 19, 1963, to H. W. Griswold and to H. W. Griswold et al., respectively, both of which relate to nonwoven fibrous webs; U.S. Pat. No. 1,716,866, issued June 11, 1929, to J.C. Sherman, relating to webs having apertures in the form of elongate slots; U.S. Pat. No. 2,113,431, issued Apr. 5, 1938, to A. D. Milliken, relating to a facial tissue product having relatively large and widely spaced and perforated holes therein; and U.S. Pat. No. 2,130,375, issued Sept. 20, 1938, to S. F. Atkins, relating to a towel product having a plurality of midely spaced, relatively large, apertures in the form of short tears of different shapes.

While some of the above processes disclosed in the cited references may be satisfactorily employed to create apertures in fibrous webs at relatively slow speeds and with widely spaced apertures of relatively large size, none of the methods and apparatus disclosed can be used to form a very fine pattern of small size apertures, especially in a fibrous web comprised of relatively short fibers of papermaking length. For example, to construct an accurate punch mechanism of relatively large area in which the number of prongs per square inch of fibrous web exceeds 100 would be impractical if not impossible. In addition, it would be extremely difficult to remove the web from the prongs in a high speed operation without tearing or otherwise damaging the web. Similar restrictions and limitations are even more obviously apparent with regard to the formation of apertures by spray or dripping techniques. In addition to the above-described problem, the formation of apertured fibrous webs on modified Fourdrinier wires of the type disclosed in the prior art presents serious problems in web pickup, especially at high speed formation rates. It would be impossible to remove the apertured fibrous web formed on the apparatus of Motz with a couch roll in the conventional manner employed in papermaking. Since the projections extend through the thickness of the web and project above the web, the couch roll would contact only the tips of the projections as Motz discloses, thereby eliminating contact of the web by the couch roll and resultant web pickup. To fasten any concentration of separate prongs or projections to the Fourdrinier wire in the manner disclosed by Greiner et al. would be impractical or impossible beyond a concentration of about 50 prongs per square inch of Fourdrinier wire.

The above-mentioned problems are believed to be more clearly apparent when the references showing various apertured fibrous web products are examined. All of these references disclose products having relatively widely spaced large size apertures which were all that could be formed by prior art methods and apparatus.

It is known that extremely high concentrations of very minute apertures can be formed in fibrous webs of relatively low basis weight by forming these webs on Fourdrinier wires having a very coarse weave. These wires are commonly referred to as high knuckle wires. Generally such wires can be used to form apertures in concentrations only as low as about 1300 per square inch of fibrous web. Above this concentration, the apertures are barely distinguishable and the web formed has the appearance of a rough sheet of ordinary paper. When high knuckle wires of even coarser weave are employed to produce a lower concentration of apertures in the fibrous web, that is less than about 1300, difficulties in several areas are experienced. Poor web formation occurs because drainage between the widely spaced wires happens so rapidly that the fibers do not settle among themselves into a stable structure. Moreover, the web stands to form down in the apertures in the wire rather than upon its surface, making removal by any means difficult. In addition, it is difficult to remove the web from the wire by means of a couch roll without damaging the web. As pressure of the couch roll against the web is reduced to prevent damage to the web on the rough forming surface of the coarsely woven or high knuckle wire, pickup is difficult and unreliable, if not impossible.

From the above it can be seen that the problems and liimtations of known methods and apparatus for forming apertured fibrous webs resolve themselves into an inability to prepare a foraminous beltlike structure which can be used as a drainage member in a papermaking machine to form fibrous webs having the desired number of apertures per unit area. If known constructions for drainage members are modified to form webs having apertures of these concentrations in accordance with methods taught in the prior art, difficulty is experienced in removing the web by conventional techniques from the drainage member of the papermaking machine. That is, it becomes difficult or impossible to pick up the web from the drainage member by means of a couch roll. In addition, in this range of aperture concentration in the web, difficulty is experienced in web formation when known drainage members are prepared and when the methods of modifying these drainage members as taught by the prior art are utilized.

SUMMARY OF THE INVENTION

Apertured fibrous webs of the present invention are noticeably different and distinct from apertured fibrous webs of the prior art in that they have a much greater concentraion of apertures per unit area of the web. The formation of such apertured fibrous webs is not possible by known prior art techniques. In addition, it has been discovered somewhat unexpectedly that fibrous webs having apertures present in the number per unit area contemplated by the invention possess the appearance of woven or clothlike materials instead of mere wet-laid fibrous webs such as paper. Moreover, webs having the concentration of apertures contemplated by the invention do not appear to be merely rough formed fibrous webs or paper sheets as do those formed in the prior art woven wire cloths having an extremely coarse weave, such as high knuckle wires. The apertures of fibrous webs of the invention are clearly and sharply defined in shape and size as a result of the new method of forming them.

It is an object and advantage of the present invention to provide a new and improved method and apparatus for forming apertured fibrous webs.

It is an object of the present invention to provide a new and improved foraminous beltlike structure for use in the manufacture of apertured fibrous webs from a fiber furnish on a papermaking machine.

It is a further object and advantage of the present invention to provide a foraminous beltlike strucure for use in forming apertured fibrous webs from which such webs may be removed by a couch roll acting through a pickup felt after their formation.

The method for forming aperture fibrous webs includes preparing a stock mixture comprising liquid and fibers. The stock mixture is delivered to a drainage member having an upper surface and a lower surface, and a plurality of apertures connecting the upper surface and the lower surface. The apertures are substantially uniformly disbursed throughout the drainage member. The drainage member includes flow control means connected thereto adapted to prevent flow of liquid from the stock mixture through the apertures in predetermined areas of the drainage member. The number of these areas is from about 100 to about 1300 per square inch of the member. By closing these areas, flow of liquid from the stock mixture through the predetermined areas of the drainage member is prevented.

The stock mixture spreads out over the upper surface of the drainage member. Preferably the stock mixture is introduced through a slice lip from a pressure headbox which promotes more rapid drainage. Fibers are removed from areas of the stock mixture overlying the predetermined closed areas during removal of liquid by drainage through the drainage member and formation of a fibrous web upon the drainage member. The apertured fibrous web formed upon the drainage member is removed from the drainage member by a couch roll.

One method for removing fibers from areas of the stock mixture overlying the predetermined areas is to deliver the stock mixture to the drainage areas under turbulent flow conditions under which the eddy currents sweep the fibers out of the desired areas during web formation. This method is facilitated by applying suction to the lower surface of the drainage member and, most preferably, the suction is applied just after the stock mixture is delivered to the drainage member so that drainage and web formation are accomplished under turbulent flow conditions.

As distinguished from most prior art processes for forming apertured fibrous webs, rearrangement of the fibers in the web and formation of the apertures occurs during the initial formation of the web. This feature of the method of the invention makes possible the formation of much smaller apertures in a much greater concentration per unit area than was possible in the past. In addition, the method of the invention for forming apertured fibrous webs permits web formation on a drainage member from which the web may be removed by means of a couch roll acting through a pickup felt, which was one of the problems experienced in the past and one of the shortcomings of prior art processes.

The apparatus for forming apertured fibrous webs includes a rotatably mounted roll and a foraminous drainage member entrained about the roll in at least partial wrapping engagement therewith. Drive means are provided for moving the upper surface of the drainage member through a continuous path. Headbox means are provided for containing a stock mixture of fibers and liquid. The headbox means include slice forming means disposed adjacent the continuous path of the drainage member for delivering the stock mixture of fibers and liquid to the upper surface of the drianage member as it moves through the continuous path past the slice forming means.

The drianage member has an upper and a lower surface, and a plurality of apertures connecting the upper surface and the lower surface. The apertures are substantially uniformly disbursed throughout the drainage member. The drainage member includes flow control means connected thereto adapted to prevent flow or liquid from the stock mixture through the apertures in predetermined areas of he drainage member. The number of the areas is from about 100 to about 1300 per square inch of the member. The apparatus can be embodied in the form of a modified Fourdrinier type papermaking machine or a forming roll or cylinder type papermaking machine.

One embodiment of the apparatus involves the use of flow control members in the drainage member in the form of closed areas of the drainage member. In another embodiment, the flow control members are projections from the upper surface of the drainage member which have a height above the upper surface of the drainage member of less than the thickness of the wet apertured fibrous web formed thereon. Surprisingly, flow control members of this nature are capable of forming aperures in a fibrous web in a manner not thought possible by the prior art. One of the surprising benefits of forming apertured fibrous webs on this type of apparatus is that the web may be removed from the forming surface by pressure contact with a couch roll acting through a pickup felt whereas projections shown in the prior art prevented pickup by couching due to their extreme height.

It is an object of the present invention to provide a mehod for preparing a foraminous beltlike structure for use in manufacturing apertured fibrous webs.

It is a further object and advantage of the present invention to provide a method for modifying conventional woven wire cloths for manufacture of apertured fibrous webs having from about 100 to about 1300 apertures per square inch arranged in a predetermined pattern.

The method for preparing foraminous beltlike structures includes forming a plurality of apertures in a predetermined pattern in a sheet of filling material leaving solid portions between the apertures. The sheet of filling material is brought into superimposing and contacting relationship with a foraminous drainage member which, in some instances, may be a woven wire cloth. Pressure is applied to the surface of the sheet most remote from the drainage member while the drainage member is supported upon a backing surface so as to cause filling material from the sheet to flow into interstices in the drainage member substantially only in areas of the member in superimposing relationship with the solid portions of the sheet, leaving areas in the drainage member, corresponding to the plurality of apertures in the sheet, substantially free from filling material.

Settable material is inserted into the apertures from the surface of the sheet most remote from the drainage member so that some of the settable material passes through the apertures and penetrates the interstices in and intimately contacts the drainage member in areas free from filling material. Lateral flow beyond the boundaries of the areas of the settable material within the drainage member is substantially prevented by the filling material within the member. The settable material is then fixed by curing it and the filling material is removed from the drainage member.

One feature of the invention is the use of a backing layer with the filling material layer which limits the depth which the filling material is pressed into the drainage member. The above described method makes possible the application of settable material in a predetermined form and amount to predetermined areas of a foraminous drainage member such as a woven wire cloth. This application may be in the form of a very large number of small, closely spaced, accurately shaped and positioned areas of the drainage member, in concentrations of from about 100 to about 1300 areas per square inch.

Additional objects and advantages of the invention will become apparent from the following detailed description thereof when read in conjunction with the accompanying drawings described below.

BRIEF DESCRIPTION OF THE DRAWINGS

FIG. 4 is a schematic side elevation view of apparatus for forming fibrous webs of the invention.

FIG. 5 is a greatly enlarged, fragmentary, sectional elevation view of a portion of the apparatus shown in FIG. 4.

FIG. 6 is a schematic sectional elevation view showing a modified form of a portion of the apparatus shown in FIG. 4.

FIG. 7 is a schematic sectional elevation view of a further embodiment of the apparatus of the invention.

FIGS. 10 and 11 are greatly enlarged, fragmentary, perspective views of portions of conventional drainage members in the form of woven wires of different weave which are utilized in a papermaking machine.

FIG. 12 is a greatly enlarged, fragmentary, perspective view of a portion of a modified drainage member, having a plurality of closed areas and adapted for use on the apparatus shown in FIG. 4 in making apertured fibrous webs of the invention.

FIGS. 13 and 14 are greatly enlarged, fragmentary, sectional elevation views of other modified drainage members of the invention, having closed and raised areas and adapted for use on the apparatus shown in FIG. 3 in making apertured fibrous webs of the invention.

DESCRIPTION OF THE PREFERRED EMBODIMENTS

(1) The apertured web

Figure 1:
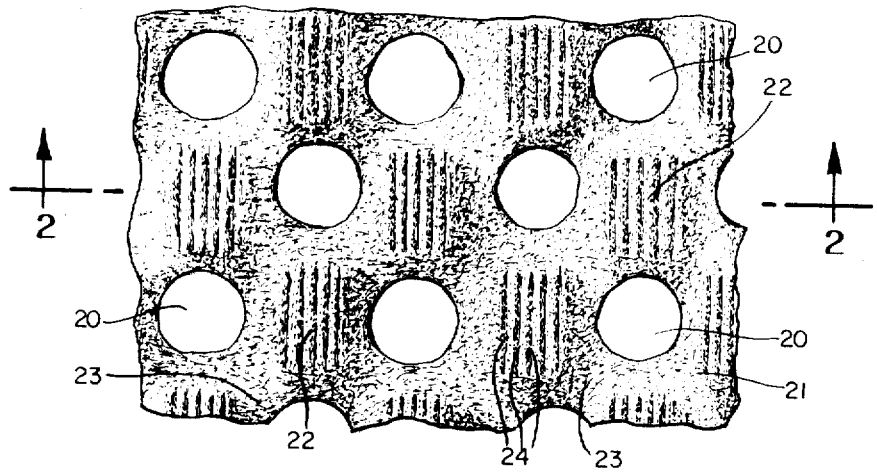
FIG. 1 is a greatly enlarged fragmentary plan view of an apertured fibrous web of the invention.

Apertured fibrous webs of the invention have a plurality of apertures or holes connecting one surface of the web with the other surface. FIG. 1 is a greatly enlarged plan view of a portion of an apertured fibrous web of the invention, illustrating apertures 20 having a circular configuration and being separated from one another and defined by solid web portions 21 comprised of paper fibers randomly interwoven and bonded together at spaced points of interfiber contact as by the bonding mechanism utilized in papermaking. Other embodiments of webs of the invention include wet strength agents, such as those of an acid cure type, for example, urea formaldehyde polyamine and melamine formaldehyde, or those of a neutral cure type, for example amine-amide, incorporated therein by addition to the fiber furnish or stock mixture from which the web is formed, or by subsequent addition as by spraying or impregnating the web. Still further embodiments of the invention include bonding agents, such as polyacrylate, polyvinyl acetate, or styrene butadiene rubbers, which are added by spraying or impregnating during or after web formation.

The apertures 20 are preferably present in the web in a density or concentration of from about 100 to about 1300 per square inch of the web. That is, the web has about 10 apertures per lineal inch at the lowest aperture concentration and about 36 apertures per lineal inch at the highest aperture concentration. Leaving adequate solid portions 21 of the web between the circular apertures 20 results in apertures 20 having diameters of from about 0.015 inch to about 0.050 inch. The cross-sectional areas of the apertures 20 preferably vary from about $.15 \times 10^{-3}$ square inch to about $2 \times 10^{-3}$ square inch.

Most preferably, the apertures 20 are present in the web in a density or concentration of from about 100 to about 700 per square inch of the web. That is, the web has about 10 apertures per lineal inch at the lowest aperture concentration and about 26 apertures per lineal inch at the highest aperture concentration. This results in apertures 20 having diameters of from about 0.020 inch to about 0.050 inch. The cross-sectional area of the apertures 20 most preferably varies from about $.3 \times 10^{-3}$ square inch to about $2 \times 10^{-3}$ square inch when adequate solid web portions 21 of the web are left between apertures 20.

The fibers in the web adjacent the periphery of each aperture 20, and forming the edge defining the aperture, tend to be substantially parallel with one another. In addition, the fibers closely adjacent to the periphery of each aperture 20 are predominantly tangent with the edge of the aperture or parallel to a tangent along the edge of the aperture. This tendency results in an accurate definition of the aperture 10 formed in the web. It stems from the manner in which the web is formed, as by the method of the invention.

As pointed out above, the formation of fibrous webs having apertures in concentrations falling within the above range has not been possible prior to the invention. One feature of the invention which contributes to the ability to produce fibrous webs having apertures in these extremely dense concentrations is the web formation process in which the apertures are created during initial web formation. This makes it possible to achieve much greater aperture definition with regard to hole size and hole shape than is possible by means of prior art processes in which apertures are formed in the web after web formation by rearrangement of the fibers. In those instances, the apertures tend to change shape due to hysteresis forces or residual stresses in the web stemming from the fibers tending to return to their original position in which they were at least partially bonded together, which is not the case in fibrous webs of the invention.

Furthermore, apertured webs of the invention have, among other features, permeability which enables them to be used for a wide variety of applications, for example, as filters or wipers. The accurate definition and formation of apertures 20 is achieved without deteriorating the normal strength level of the solid portions 21 forming the web. Prior art processes for forming apertures either while the web was wet, or subsequent to drying, as by perforation, resulted in degradation of the web through destruction of bonds, compression of the web, and other phenomena which lessened its value for many uses. For example, fibers or shorter fibrils, were loosened by prior art processes for forming apertures, and became detached from the web when used as a wiper, and were deposited on the surface being wiped. Similar problems were experienced in filtering applications. Apertured webs of the invention exhibit superior structure in this regard, in that the bonds created during formation are generally intact in the absence of further processing. Many uses for apertured fibrous webs of this nature are present, such as in forming tea bags or in other filtering applications. The webs also have been found useful in absorbent sanitary articles, such as sanitary napkins or disposable diapers.

It has also been found that apertured fibrous webs containing holes falling in the above-described size ranges and concentrations per unit area resemble to a varying degree, in both appearance and characteristics, woven fabrics made of interwoven warp and weft strands. That is, an apertured fibrous web is produced in accordance with the above which has the general appearance of a woven cloth. Furthermore, by selection of fiber length, basis weight and other parameters of the web, the drape and hand of the web can be made to approximate or resemble woven cloth. The preferred range of aperture concentration in apertured fibrous webs which are intended to resemble woven cloth is from about 100 to about 700 apertures per square inch. The most preferred aperture concentration in apertured fibrous webs intended to resemble woven cloth is in the range of between about 250 and about 650 apertures per square inch.

The apertures in the fibrous webs of the invention may be formed in any desired pattern as well as that of a woven fabric. This makes it possible to form fibrous webs containing designs without the use of a printing process. Instead, the apertures can be used as decoration, and the webs may be incorporated into products where decoration is desired. The shape of the apertures in webs of the invention can also be varied and controlled in a predetermined manner. It has been found that a change in the shape of the apertures formed in the web results in changes in the overall appearance and sometimes the physical characteristics of the apertured fibrous web. Depending upon the use to which the webs are put, the shape of the apertures and their pattern or position relative to one another in the web can have a beneficial effect on function of the web. In some instances, elongate apertures having a length in the machine direction equal to 5 times the width in the cross-machine direction have been formed, such webs exhibiting considerable cross-machine direction stretch when the apertures in alternate rows are staggered relative to the apertures in adjacent rows.

Apertured fibrous webs according to the invention have been made in a variety of different basis weights varying from about 4 pounds per 2880 square feet to about 35 pounds per 2880 square feet. Best results have been achieved in producing webs resembling woven cloth materials with lower basis weight webs, that is, webs on the order of from about 4 pounds per 2880 square feet to about 16 pounds per 2880 square feet. Webs of greater basis weight do not have quite as definite an outline around the apertures defining the shape of the aperture due to problems in rapid formation of heavier weight webs. For example, sometimes overlapping fibers extend into the apertured areas detracting to some degree from its sharp outline.

All of the above has been found to be dependent somewhat on the type of fibers employed and their length. To achieve a fine pattern of apertures, that is apertures in concentrations of from about 600 to about 1300, it has been found preferable to use fibers of papermaking length, that is less than about ¼ inch. However, for forming webs having aperture concentrations of from about 100 to about 600 apertures per square inch, fibers of papermaking length as well as fibers of greater length may be employed satisfactorily. As indicated above, this depends somewhat upon the basis weight of the web being formed.

Figure 2:
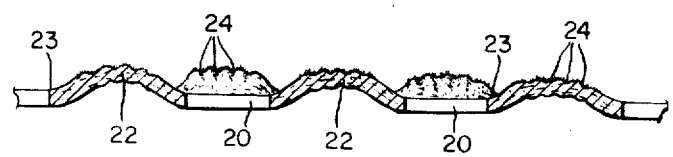
FIG. 2 is a sectional elevation view taken along line 2—2 of FIG. 1.

When apertured fibrous webs of the invention are creped in a conventional manner, as by a creping doctor cooperating with the surface of a Yankee dryer, distinctive and unique properties and characteristics are imparted to the webs. FIGS. 1 and 2 illustrate some of these characteristics in a typical apertured fibrous web which has been treated in this manner.

Depending upon the pattern of apertures in the web, the creping in influenced to a greater or lesser extent but generally exhibits a regularity of creping not normally observed in conventional grades of paper. In addition, the creping imparts an undulating cross section to the web which is much like that achieved by mechanical embossing of the web in either the wet or the dry condition. That is, the web, in addition to having spaced apertures 20, has a plurality of spaced hills or raised areas 22 and valleys or depressions 23. The position of these raised areas 22 and depressions 23 is influenced by and generally governed by the pattern of apertures 20 in the web. Thus, it can be seen from FIGS. 1 and 2 that the raised areas 22 are generally disposed centrally between a group of more than two apertures 20 while the depressions 23 are generally located between two adjacent apertures 20 and about the periphery of the apertures 20. That is, the depressions 23 appear in web portions between two adjacent apertures 20, which web portions separate the apertures 20 from one another and generally define a portion of the periphery of the apertures 20. These web portions join together at a nexus which is generally in a raised area 22 between a group of more than two apertures 20 as shown in FIG. 1. By varying the size, shape and concentration of apertures 20 in the web, the size, shape and frequency of occurrence of the undulations, or raised areas 22 and depressions 23, can be influenced.

A distinctive characteristic of such webs is the softness and high bulk of the raised areas 22. The raised areas 22 are the portions of the web which are contacted by the creping doctor and creped. It has been found that generally the number of creping marks 24 imparted to each raised area 22 is substantially uniform with a given web. The resulting web product contains both apertures 20 promoting absorbency or fluid permeability and raised areas 22 extending generally above the plane of the apertured web, the upper surface of which exhibits good softness characteristics and absorbency which makes it ideal for use in many products, for example, in a paper wiper.

(2) Method for forming apertured webs

In the method of the invention for forming apertured fibrous webs, a stock mixture is prepared by mixing fibers into a liquid. The stock mixture preferably has a consistency corresponding to the consistency of papermaking furnishes, that is, an amount of fibers on the order of 0.2 to 0.5 percent by weight of the resulting stock mixture. The stock mixture in that instance is practically a suspension of fibers in liquid although agitation is required to maintain proper dispersion of the fibers. The above conditions will vary depending upon the type of fibers employed and their length.

The stock mixture is delivered to the upper surface of a drainage member having an upper surface and a lower surface and a plurailty of apertures connecting the upper surface and the lower surface. The apertures are substantially uniformly disbursed throughout the drainage member. In many instances the drainage member comprises a woven wire cloth such as that used as a Fourdrinier wire in which the apertures comprise the interstices between the interwoven strands of the wire. The drainage member includes flow control means connected thereto which are adapted to prevent flow of liquid from the stock mixture through the apertures in predetermined areas of the drainage member by blocking or closing those apertures.

Flow of liquid from the stock mixture through the predetermined areas of the drainage member is prevented by the flow control means whereas flow of liquid from the stock mixture through the apertures of the drainage member in areas between the flow control means is permitted. During removal of liquid or drainage through the drainage member, which results in the formation of a fibrous web upon the drainage member, fibers are removed by fluid action from areas of the stock mixture overlying the predetermined closed areas of the drainage member through which drainage is prevented by the flow control means. That is, any fibers temporarily deposited upon the drainage member in the predetermined closed areas are immediately swept away or otherwise removed during web formation. Thus, the web is formed without fibers overlying those predetermined areas of the drainage member. This results in the formation of apertures in the fibrous web formed upon the drainage member. The apertured fibrous web is then removed from the drainage member by a couch roll acting through a pickup felt. In some instances, the web may be removed directly by a couch roll without using a pickup felt.

The predetermined areas may include a portion or all of one or several apertures of the drainage member. Furthermore, the predetermined areas need not be arranged in registration with the drainage member relative to apertures therein. The number of the predetermined areas may vary quite widely, the upper limit of the concentration of such areas being about 1300 per square inch of the member. Above that level of concentration, apertures formed by the method of the invention lose their sharp definition of size and shape. This is believed to be partly due to the fact that individual fibers have a length sufficient to allow them to extend from one aperture to another, thereby tending to bridge or randomly cross the predetermined closed areas intended to form apertures. This results in the forces causing deposition of the fiber upon certain unblocked areas of the drainage member conflicting with the forces tending to remove or sweep away any temporarily deposited fibers on the closed areas.

Fibers are removed from areas of the stock mixture overlying the predetermined areas of the drainage member in the preferred embodiment of the invention by delivering the stock mixture to the upper surface of the drainage member under turbulent flow conditions and by accomplishing web formation before such turbulent flow conditions subside. It has been found that when a stock mixture is introduced onto a moving drainage member in the form of a slice moving substantially parallel to the surface of the drainage member, eddy currents are created locally at the interface between the drainage member and the stock mixture. These eddy currents are believed to stem from several sources but their origin is not entirely understood. One condition that tends to cause eddies is a speed differential between the speed of the stock mixture and the speed of the drainage member. However, it has been found that eddies and turbulent conditions generally are present to a sufficient degree to form apertured fibrous webs even when this speed difference is not present in any substantial amount.

However, the local eddy currents sweep the fibers from areas in the stock mixture overlying flow control members, that is, blocked or closed areas of the drainage member through which drainage is prevented. In other areas of the drainage member where drainage is permitted through the apertures of the drainage member, the force against the fibers caused by fluid flow during drainage is sufficient to hold the fibers to the wire in the form of a fibrous web.

Figure 3:
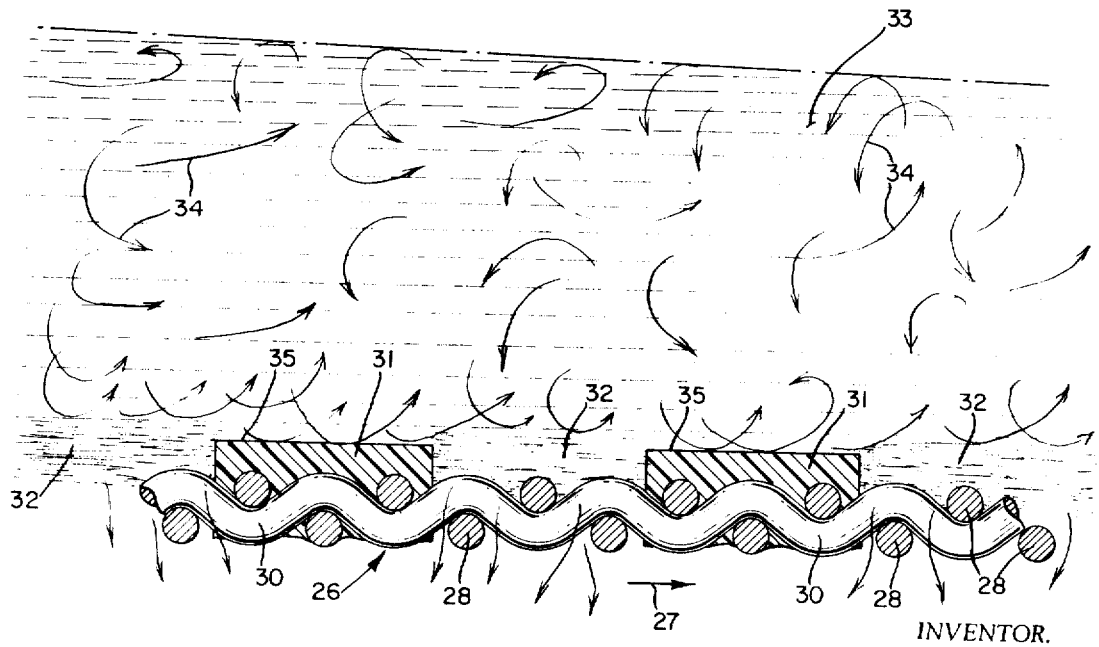
FIG. 3 is a greatly enlarged diagrammatic elevation view illustrating fluid flow during apertured web formation by the method of the invention.

FIG. 3 is a diagrammatic view, illustrating the action of turbulent flow conditions during web formation. A drainage member, indicated generally by reference numeral 26, is moving in a direction indicated by arrow 27. Drainage member 26 is formed of interwoven warp strands 30 and shute strands 28 which form a foraminous surface having a plurality of uniformly dispersed apertures formed by and disposed between the interwoven strands. A plurality of flow control members, one of which is indicated at 31, are secured to the drainage member 26 and have projecting portions which extend above the upper surface of the drainage member 26 for a distance which is less than the thickness of the wet web 32 to be formed thereon.

A stock mixture 33 comprised of liquid and fibers is disposed upon the upper surface of the drainage member 26. Drainage of liquid of the stock mixture 33 occurs through the foraminous areas of the drainage member 26 between flow control members 31. As liquid passes through the apertures of the drainage member 26, the fibers in the stock mixture 33 are deposited and collected on the drainage member 26 in random array and form the web 32. Further drainage of liquid holds the fibers, so deposited and collected, in position as additional fibers are deposited and collected on top of them to form the web 32. The drainage may be speeded up by suction from the bottom of drainage member 26. Eddy currents, indicated by arrows 34, are present in the stock mixture 33 during the turbulent flow conditions of web formation. The eddy currents 34 sweep fibers from the upper surface 35 of flow control member 31 where no drainage forces hold the fibers in place or accumulate them together. The eddy currents 34 do not disturb, to any significant degree, the fibers in areas overlying drainage areas of the member 26. The web 32 can be formed with a thickness greater than the height of surface 35 above the upper surface of member 26 while still forming apertures in the web 32 over the members 31. The eddy currents 34 when a web 32 is formed under turbulent flow conditions are able to remove the fibers from these areas even when the web 32 has a relatively high basis weight, on the order of 35 pounds per 2880 square feet, and a correspondingly large thickness.

It has been found extremely advantageous to apply a vacuum after the stock mixture 33 is delivered to the upper surface of the drainage member 26 to assist in apertured web formation. It is preferred to accomplish web formation during turbulent flow conditions. Since turbulent flow conditions exist only a short time after the stock mixture 33 contacts the drainage member 26, the suction assists in achieving drainage and web formation within a short time after delivery of the stock mixture 33 to the drainage member 26 and after the web 32 has been carried upon the drainage member 26 only a very short distance.

(3) Apparatus for forming apertured webs

One embodiment of apparatus of the invention for forming apertured fibrous webs is illustrated in FIG. 4 of the drawings. Fiber furnishd 33, comprising a stock mixture of fibers in a liquid, normally water, is fed from a headbox 38 through a slice forming means 40 onto the substantially horizontal surface of a woven wire cloth or drainage member 26 through which the liquid is withdrawn and upon which web formation takes place. Member 26 is entrained around a breast roll 41 and over a plurality of table rolls 42 to a wire turning roll 43. It is then fed around a lower couch roll 44, two guide rolls 45, and a stretch roll 46, and then back to breast roll 41.

One or more of the above-described rolls is driven by motor 47 through belt 48 and propels the drainage member 26 through the desired path so that the upper surface or flight moves from the breast roll 41 to the lower couch roll 44 and returns along the bottom. A plurality of vacuum boxes may be disposed beneath the upper flight of member 26 between table rolls 42 and wire turning roll 43. In addition, deflectors or hydrofoils 51 are employed between table rolls 42 to assist in the removal of water from the web during its formation.

A web formed from the fibers in the stock mixture 33 deposited on member 26 at the slice forming means 40 is removed from wire 26 by a moving pickup felt 52, pressed into engagement therewith by a rotating upper couch roll 53. The web may be subsequently dried and treated as is well known in the paper-making art. Thus, the web may be dried, calendered and creped, as desired.

The drainage member includes flow control means affixed thereon which are adapted to prevent flow of liquid from the stock mixture 33 through the apertures in predetermined areas of the drainage member 26. The flow control means in some embodiments comprise flow control members 31 closing the apertures in the predetermined areas of drainage member 26. The members 31 have a height above the upper surface of the drainage member 26 of up to about the thickness of the wet apertured web formed on the apparatus. This allows the removal of apertured fibrous webs formed on apparatus of the invention by means of a couch roll operating through a pickup belt. Further details of the construction of drainage member 26 are explained below.

In the embodiment of apparatus of the invention illustrated in FIG. 4, a stationary vacuum box 54 is employed on the interior of rotating breast roll 41 and beneath the drainage member 26 in the area where stock mixture 33 is delivered to the drainage member 26. Breast roll 41 is in the form of a suction breast roll. The vacuum box 54 connects to a source of vacuum or reduced pressure, as through the hollow shaft upon which roll 41 rotates. A conduit system (not shown) is provided for removal of liquid passing through drainage member 26 during web formation. The extent of the vacuum box 54 and the pressure drop applied thereto depend in part on the speed of web formation and the degree of turbulence present. In general, its length can be longer and its pressure drop can be lower when speed of formation is slow and the turbulent conditions will last longer. However, where the degree of turbulence is low and formation occurs rapidly, then its length can be shorter and its pressure drop can be higher. It should extend preferably from the point where stock mixture 33 first contacts member 26 and web formation begins to the point where turbulence ceases and web formation is substantially complete, that is, where noticeable apertures are created in the web. Depending on many factors, this may vary from several inches to a foot or more in length of web formed.

FIG. 5 is a greatly enlarged view of a portion of the apparatus shown in FIG. 4, showing the disposition of the vacuum box 54 relative to the slice forming means 40. Vacuum box 54 is divided into several successive compartments, 55 and 56. Compartment 55 is generally maintained at a higher vacuum than compartment 56 in order to most advantageously control the pressure drop through the web during formation. Compartment 55 begins near the end of lower lip 57 of slice forming means 40 and terminates near the end of upper lip 58 of sliced forming means 40. Compartment 56 begins at the end of compartment 55, that is, at the end of upper lip 58 of slice forming means 40, and extends along the circuference of breast roll 41 for a distance beyond the point where drainage member 26 leaves the surface of breast roll 41. The drainage member 26, carrying flow control members 31, passes beneath lower lip 57, through the slice, and beneath upper lip 58 while carried upon the outer surface of the suction breast roll 41.

Suction breast roll 41 includes a perforated shell 60 having a plurality of spaced holes 61 arranged in circumferentially-spaced rows. Radially-depending ribs 62 are disposed between the rows of holes 61, which ribs 62 support a plurality of spaced, circumferentially-running strips 63. Together, rib 62 and strips 63 form a grilled structure, partially open, upon which is disposed a wire screen 64 wound about breast roll 41. Screen 64 contacts the drainage member 26 carrying flow control members 31 as it runs about roll 41.

FIG. 6 shows another embodiment of apparatus of the invention, in which a grilled breast roll 65 is employed in place of the suction breast roll 41. In its construction, roll 65 resembles roll 41 except that the shell 60 is not perforated and the vacuum box 54 is not present. Instead, a vacuum box 66 is employed beneath drainage member 26 following roll 65 and functions to assist in drainage and removal of liquid from the stock mixture 33 to form a web under turbulent conditions, that is, before the eddy currents existing at the slice forming means 40 have subsided, in accordance with the method of the invention. Again, vacuum box 66 has two compartments which function in a manner similar to compartments 55 and 56 of vacuum box 54. The significant difference between the apparatus of FIGS. 4 and 5 and that of FIG. 6 is that the major drainage and web formation occurs on the apparatus of FIG. 6 after the drainage member 26 has passed through the sliced forming means 40, instead of within the slice region. In this regard, the apparatus shown in FIGS. 4 and 5 is generally preferred, as turbulent conditions are usually more effective there in the formation of apertures since they have not had as much opportunity and time to subside where machine speeds are equal.

Another embodiment of apparatus in the invention is illustrated in FIG. 7. FIG. 7 shows a cylinder or forming roll machine, where substantially complete web formation takes place in a very short circumferential distance on the roll, after which the web is removed from the drainage member 26. The drainage member 26 is carried upon and wrapped completely around the breast roll 67. As in the embodiment shown in FIGS. 4 and 6, stock mixture 33 is delivered to the upper surface of drainage member 26 in the form of a slice from a headbox 38 through a slice forming means 40. The breast roll 67 is of the same general construction as described above with reference to FIG. 5 and includes a suction box 68 having two compartments corresponding to suction box 54. The web formed is removed from roll 67 by the action of a couch roll 70 operating through a pickup felt 71.

Figure 8:
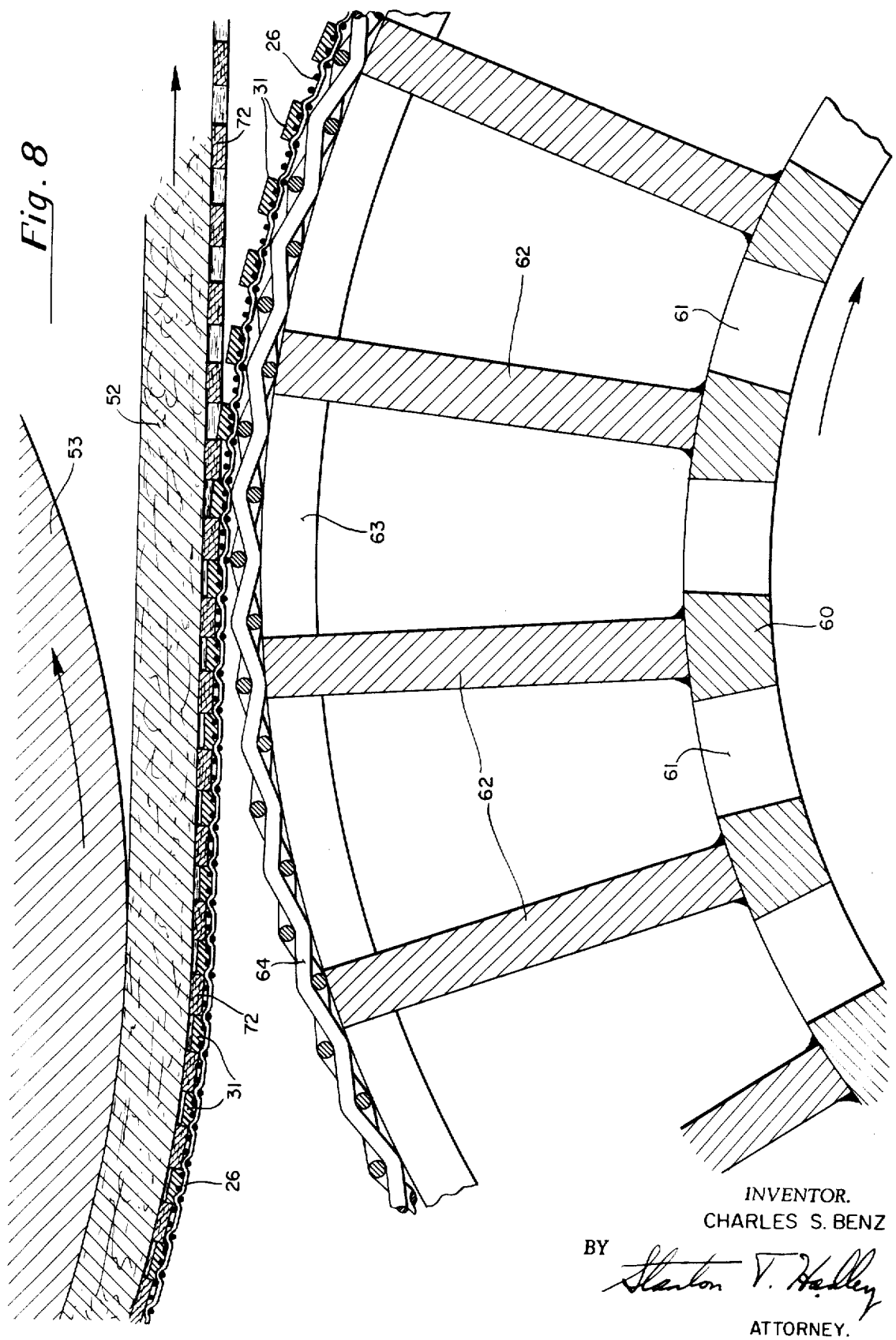
FIG. 8 is a schematic sectional elevation view of a portion of the apparatus shown in FIG. 4, illustrating a "soft" pickup of a web formed thereon by a couch roll.
Figure 9:
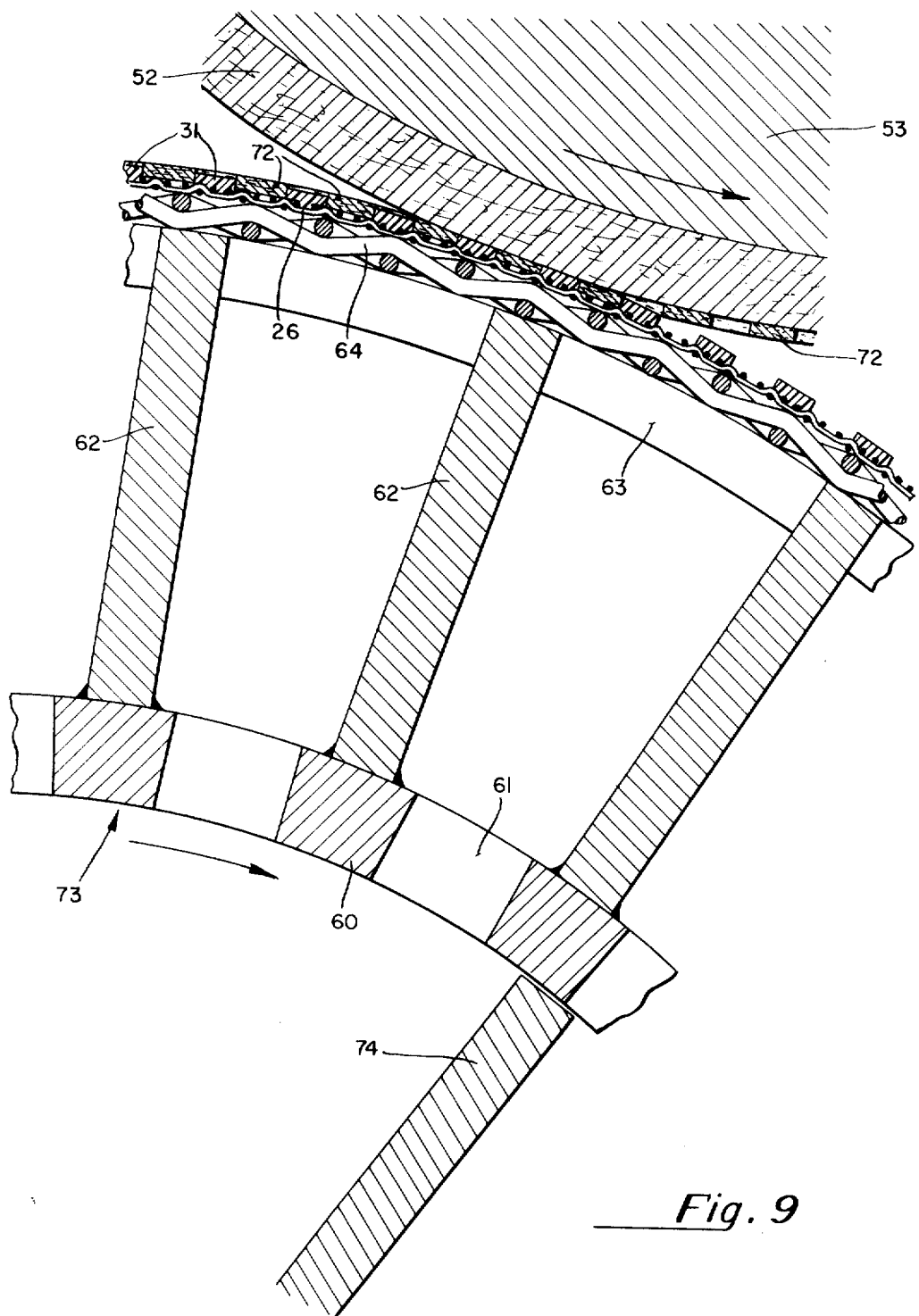
FIG. 9 is a schematic sectional elevation view of a portion of a modified form of the apparatus shown in FIG. 4, illustrating a "hard" pickup of a web formed thereon by a couch roll.

FIGS. 8 and 9 show portions of several different embodiments of the apparatus of the invention and illustrate the manner in which apertured fibrous webs of the invention are removed from the drainage member 26 in accordance with conventional papermaking methods. FIG. 8 is a greatly enlarged, sectional elevation view of a portion of the apparatus shown in FIG. 4 and illustrates the type of web pickup known as a "soft" pickup. In this arrangement of apparatus, the upper couch roll 53 about which the pickup felt 52 is entrained, contacts the web 72 as it is carried on the drainage member 26 at a point where the drainage member 26 is unsupported by the lower couch roll 44. That is, the web 72 is pressed into engagement with the pickup felt 52 at a point preceding the point where the modified drainage member 26 contacts the lower couch roll 44. The lower couch roll 44 has a structure similar to the structure of the grilled breast roll 65 described above.

Where the above-described pickup arrangement is utilized, very little compression of the web 72 occurs and the pressure which does occur between felt 52 and web 72 is distributed over a greater surface, since the web 72 and the drainage member 26 temporarily partially wrap upper couch roll 53 covered by pickup felt 52. In this instance, web pickup is reliably accomplished so long as pickup felt 52 contacts a substantial portion of the surface of the apertured fibrous web 72 being transferred. It has been found that reliable web pickup can be accomplished when the flow control members 31 on drainage member 26 extend upwardly from the surface of the drainage member 26 for a height of up to the thickness of the apertured fibrous web 72 itself. Of course, by use of the method of the invention, apertured fibrous webs can be formed on modified drainage members 26 where the flow control members 31 have a height substantially less than the thickness of the apertured fibrous web being formed. Pickup of the web in those instances with the above arrangement of apparatus is quite reliable and successful.

FIG. 9 is a greatly enlarged, fragmentary sectional elevation view of an embodiment of apparatus which could be that shown in FIGS. 4, 6, or 7. For example, the roll, indicated generally by reference numeral 73, about which the modified drainage member 26 is wrapped, might be a lower couch roll 44 of the type employed with the apparatus of FIGS. 4 and 6, or it might be the roll of a forming roll type of papermaking machine in which the modified drainage member 26 is wrapped entirely about the roll 73. The structure of the roll 73 in any instance is substantially the same. A stationary suction box, a portion of which is shown and designated by 74, is generally disposed on the interior of the roll 73 and adapted to draw moisture expressed from the apertured fibrous web 72 at the nip as well as moisture carried on the modified drainage member 26 as it leaves the web 72. In this arrangement, an upper couch roll 53 carrying a pickup felt 52 is pressed into engagement with the web 72 carried on the modified drainage member 26 while the drainage member 26 is supported upon the surface of the roll 73. With this arrangement of apparatus, which accomplishes web transfer by what is called a "hard" pickup, considerable compression of the web 72 and the felt 52 occurs at the nip. It will be apparent to those skilled in the art that if flow control members 31 extending upwardly from drainage member 26 prevent contact of the felt 52 with the web 72, that web pickup will not be reliably accomplished, if at all. In the above arrangement of apparatus, it has been found that for reliable web pickup, flow control members 31 should not extend upwardly from drainage member 26 for a height of greater than about 90% of the thickness of the apertured fibrous web 72 being formed thereon.

(4) The foraminous beltlike structure

Foraminous beltlike structures of the invention include conventional drainage members of the type used in wet laying processes such as Fourdrinier wires in papermaking which have been modified in a manner which enables them to be used in the formation of apertured fibrous webs. The term "drainage member" as used throughout the specification and the claims is intended to encompass all types of foraminous structures although woven cloths or wires formed from strands of material such as spun glass, plastic, metal or combinations thereof are preferred because of their availability, ease of construction, and physical properties such as flexibility and wear life.

FIGS. 10 and 11 are perspective views illustrating conventional drainage members in the form of Fourdrinier wires. FIG. 10 shows a woven wire of "plain" weave, while FIG. 11 shows a woven wire of "twill" weave. The wire comprises a plurality of parallel, spaced-apart warp strands 77 interwoven with a plurality of parallel, spaced-apart shute strands 77. Woven wire cloths of a plain or twill weave, as shown in FIGS. 10 and 11, may be used, as well as other types of woven wires, in forming modified drainage members of the invention. However, woven wires of this type generally comprise at least two sets of strands, one set including a plurality of spaced longitudinal or warp strands 77 extending lengthwise of the structure and the other set including a plurality of spaced transverse or shute strands 76 extending crosswise of the structure. The longitudinal strands 77 are interwoven with the transverse strands 76 to form a foraminous woven wire structure. Pairs of longitudinal strands cooperate with pairs of transverse strands to form interstices 78 through the woven wire structure. The size of the interstices 78 depends upon the spacing of the parallel strands in each set relative to one another as well as the diameter of such strands, either or both of which factors may be controllably varied in the manufacture of the woven wire to provide different drainage characteristics as well as different sheet forming characteristics as is well understood in the art. The woven drainage member formed in this matter has undulating upper and lower surfaces caused by the bending or crimping of strands of at least one, and usually both, of the sets of strands.

The interstices of conventional woven wires used satisfactorily as drainage members after modification in accordance with the invention vary in number per square inch of the wire from about 1600 to about 9500. The cross-sectional area of interstices in such woven wires depends upon a number of factors such as the diameter and spacing of the strands forming the woven wire and can also be varied quite widely from one wire to another. Such wires are conventionally up to 60 feet or more in length and have a width of up to 200 inches or more. Although these types of woven wire cloths are most commonly modified and utilized as drainage members on apparatus for forming fibrous webs, the invention is equally applicable to the modification of drainage members of different types, such as solid web or sheet materials or the like having punched apertures therein.

In accordance with the invention, the woven wire cloth or drainage member is modified to control the deposition of fibers upon its upper surface and the drainage of liquid through it in a manner which creates an apertured fibrous web of the nature described above. Foraminous beltlike structures of the invention include drainage members of the types shown in FIGS. 10 and 11, which have flow control means 31 as shown in FIG. 3, affixed thereto adapted to prevent flow of liquid from a fiber furnish disposed thereon through the apertures in predetermined areas of the drainage member, the number of these areas being from about 100 to about 1300 per square inch of the member and each area being preferably of the order of from about $.15 \times 10^{-3}$ to about $2 \times 10^{-3}$ square inch.

One embodiment of a foraminous beltlike structure of the invention is illustrated in the greatly enlarged, fragmentary plan view of FIG. 12. The flow control means employed in the structure of FIG. 12 comprise spaced bodies or members 80 composed of a settable material which intimately contacts and adheres to the surfaces of the warp strands 77 and shute strands 76 forming the drainage member. The bodies 80 of settable material fill at least a portion of one or several apertures or interstices 78 defined by pairs of adjoining warp strands 77 and shute strands 76 interwoven with one another, thereby impeding or preventing drainage of liquid through the portions of the apertures 78 blocked. Significantly, the flow control members 80 illustrated in FIG. 12 do not extend substantially above the crests 81 of the strands on the upper surface of the drainage member and yet have been found capable of forming apertured fibrous webs in accordance with the method of the invention described above.

FIGS. 13 and 14 are greatly enlarged, sectional elevation views of portions of modified embodiments of foraminous beltlike structures of the invention. In FIG. 13, the woven wire being modified is of plain weave, while in FIG. 14, the woven wire being modified is of twill weave. In these embodiments, the flow control means comprise flow control members 80 which have projecting portions 83 extending above the upper surface of the drainage member, that is, above the plane in which the crests 81 of the strands forming the drainage member lie on one surface of the drainage member. As mentioned above, preferably the height of the projecting portion 83 of the flow control member 80 above the surface of drainage member 26 is less than the thickness of the wet apertured web 84 being formed, measured at the point where the web is removed from the drainage member. Preferably, the height of the projecting portion 83 is less than about 90 percent of the thickness of the wet fibrous web 84 being formed. For forming apertured fibrous webs having a basis weight of from about 4 to about 35 pounds per 2880 square feet, with apertures having a size of from about $.15 \times 10^{-3}$ square inch to about $2 \times 10^{-3}$ square inch, the height of the projecting portion 83 above the upper surface of the drainage member 26 is preferably from about $2 \times 10^{-3}$ inch to about $15 \times 10^{-3}$ inch, when paper fibers are utilized. The relationship between the height of projecting portion 83, the aperture size, and the basis weight is not critical but selection of the large number of variables may influence to some degree the characteristics of the web being formed. For example, where a higher basis weight web, for example, 30 pounds per 2880 square feet, is to be formed with apertures having a relatively small cross-sectional area, for example, $.20 \times 10^{-3}$ square inch, sharper aperture definition will be obtained with the method of the invention if the projecting portions 83 have a somewhat greater height, that is, $10 \times 10^{-3}$ inch than would be obtained with a height of $4 \times 10^{-3}$.

The portion 85 of each flow control member 80 within the drainage member, which portion 85, is hereinafter referred to as the root portion, is disposed within the space defined by planes determined by the crests 81 on each respective side of the drainage member. The root portion 85 has a cross section which may be somewhat irregular in shape throughout its length through the drainage member 26 without effecting the method of the invention. The accuracy and definition of apertures in the web 84 formed are largely determined by the projecting portion 83. The root portion 85 may taper inwardly slightly from the upper surface of drainage member 26 adjacent projecting portion 83 to the lower surface of drainage member 26. This stems from the manner in which the drainage member is modified as described below. Its effect, if any, is to promote more rapid drainage through unblocked portions of drainage member 26, facilitating more rapid web formation since the resistance to flow through the drainage member 26 is slightly reduced.

The flow control members 80 are affixed to the drainage member 26 by their root portions 85. The settable material in root portions 85 partially or completely surrounds strands forming drainage member 26 and sets, becoming stiff or rigid and preventing withdrawal. In some instances, attachment is physical, relying only upon the above-described mechanism to affix members 80 to drainage mmeber 26. In other instances, the nature of the settable material may be such that it adheres to the surface of the strands of drainage member 26, and is affixed thereto in that manner also.

(5) The method for preparing the formaminous belt-like structure

Figure 15:
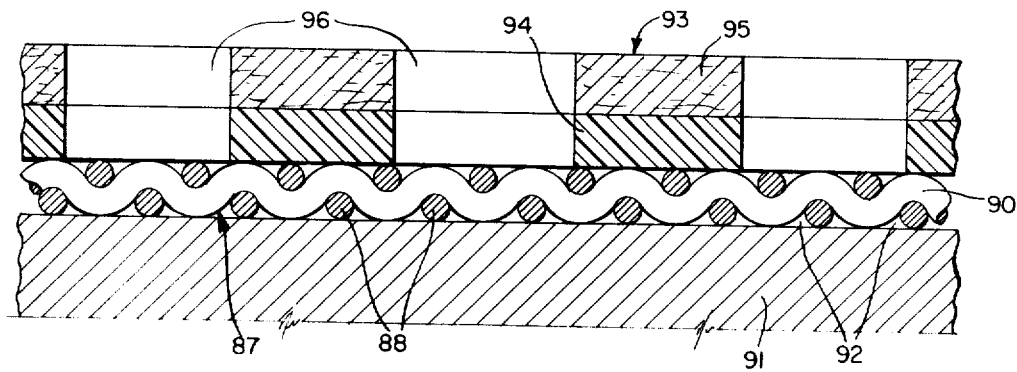
FIGS. 15, 16 and 17 are greatly enlarged, sectional elevation views, which sequentially illustrate steps in the method of forming foraminous beltlike structures of the invention.
Figure 16:
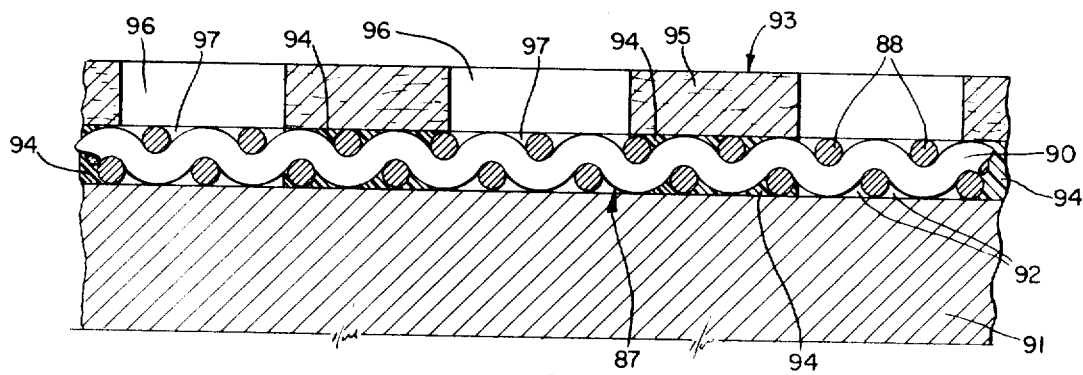
Figure 17:
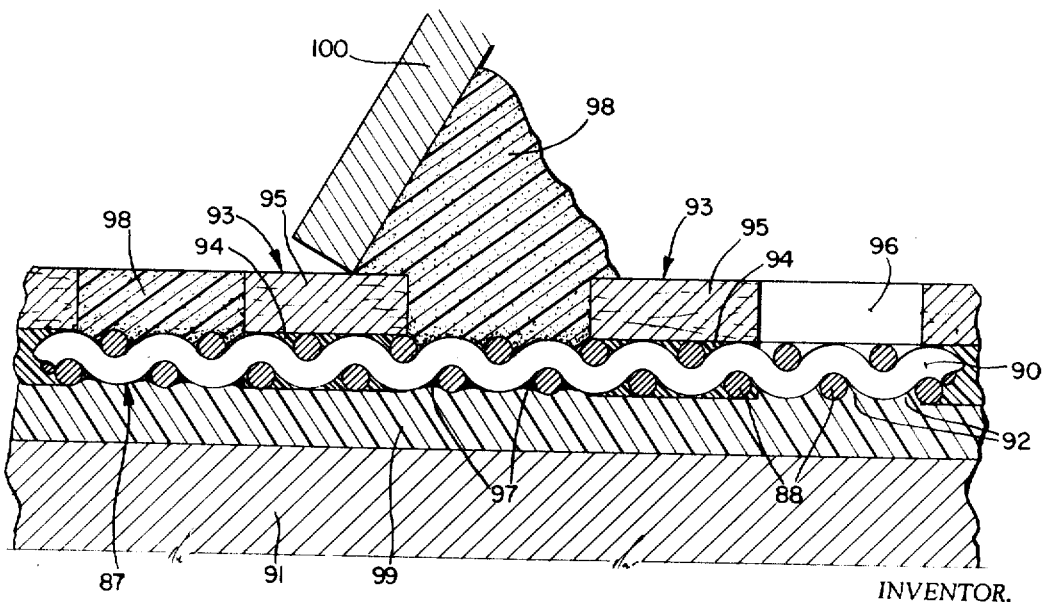

FIGS. 15, 16 and 17 are sectional views taken through a drainage member in a direction perpendicular to one set of strands forming the drainage member. These views progressively illustrate the manner in which the drainage member, which comprises a woven wire of plain weave, is modified in accordance with the method of the invention to enable it to be used in forming apertured fibrous webs of the invention.

In FIG. 15, the drainage member, indicated generally by reference numeral 87, is comprised of a plurality of parallel, spaced-apart warp strands 88 interwoven with a plurality of parallel, spaced-apart shute strands 90 arranged generally perpendicular to the warp strands 88. The drainage member 87 is disposed upon a firm surface 91, which in some instances may be the surface of a roll, for example. The surface 91 prevents the passage of material beyond the lower surface of member 56. A composite sheet, designated generally by reference numeral 93, which includes a layer 94 of filling material and backing layer 95, is brought into superimposing and contacting relationship with the drainage member 87. The layer 94 of filling material faces and contacts the upper surface of drainage member 87 and the backing layer 95 is spaced from drainage member 87 by the layer 94.

The backing layer 95 comprises any dimensionally stable material, such as a fiberboard material, cardboard, plastic, or a woven fabric which in some instances may be impregnated with polymeric material to give it greater rigidity. Card stock has been employed satisfactorily as backing layer 95 as has also polystyrene.

The layer 94 of filling material may be any material which is capable of plastic flow under pressure or heat and pressure. In some instances, it might even be a thick paste which is highly viscous, almost to the point where it constitutes a gel. The filling material is preferable soluble in a liquid solvent so that, at the completion of the method, it may be removed by dissolving it in a solvent. Water soluble resins, such as polyvinyl alcohol, have been successfully employed as filling materials. Other materials are equally satisfactory, such as polyvinyl acetate, which is soluble in solvents such as methyl ethyl ketone. Another example is a mixture of a polyvinylacetatepolyethylene copolymer blended with a microcrystalline wax. Any of the commercially available thermoplastic resins are satisfactory for use as filling materials in layer 94. These materials may be slightly softened by heat where required before being pressed into the drainage structure.

Composite sheet 93 contains a plurality of apertures 96 arranged in a predetermined pattern. The apertures are generally formed by passing the composite sheet 93 through a punch and die apparatus where apertures of the desired shape are cut into the sheet 93. Typical thicknesses for composite sheet 93 are in the range of from about 0.008 inch to about 0.020 inch, and the materials generally comprising the filling material 94 and the backing layer 95 provide little resistance to punching and enable the formation of apertures 96 of accurate size and shape. The apertures 96 have a size, shape and concentration through composite sheet 93 which correspond to the size, shape and concentration of the flow control members desired in drainage member 87. As will be seen subsequently, in the preferred embodiment of the method of the invention, the thickness of backing layer 95 generally determines and controls the height of the projecting portions of the flow control members being formed.

Pressure is applied to the surface of the composite sheet 93 most remote from the drainage member 87 while the drainage member 87 is supported upon the firm surface 91. The pressure should be sufficient to cause filling material 94 from sheet 93 to flow into interstices in drainage member 87 between the warp strands 88 and shute strands 90 and into contact with surface 91 substantially only in areas of drainage member 87 which are in superimposing relationship with the solid portions of the composite sheet 93 between apertures 96, that is, areas of drainage member 87 lying beneath solid portions of composite sheet 93 between apertures 96. This leaves areas 97 in drainage member 87, corresponding to the plurality of apertures 96 in the sheet, substantially free from filling material 94. As the filling material 94 flows under pressure into the drainage member 87, it spreads out slightly within the drainage member 87 beneath the upper surface thereof. As was pointed out above and as will become apparent subsequently, this is beneficial in insuring that the size and shape of apertures created in fibrous webs formed on the drainage member will be accurate.

With the type of sheet 93 employed in FIG. 15, it is easy to control the amount of pressure required to properly insert the filling material into drainage member 87. In that instance, the layer 94 of filling material is made a thickness which will insure the proper penetration of filling material when the backing layer 95 has been pressed into a position of contact with the crests of the warp strands 88 and the shute strands 90 which are directed toward the upper surface of drainage member 87 as shown in FIG. 16. However, it is also possible to eliminate the backing layer 95 from the composite sheet 93. In that instance, the layer 94 of filling material is made of a thickness which insures adequate penetration of filling material into drainage member 87 when the remainder of the sheet of filling material is above the upper surface of drainage member 87 as defined by the plane of the crests of warp strands 88 and shute strands 90.

The actual thickness of the layer 94 of filling material depends upon the amount of material needed to fill the interstices in the desired portions of the drainage member 87. It will depend upon the thickness of the drainage member 87 as well as its relative porosity or the size of the apertures or interstices therein. Where a woven wire cloth is utilized as drainage member 87, it will depend in part upon the diameter and spacing of the warp strands 88 and shute strands 90 comprising the wire cloth. Typically, the thickness of the backing layer 95 may be from about 0.002 inch to about 0.015 inch, while the thickness of the layer 94 of filling material may be from about 0.002 inch to about 0.020 inch.

As shown in FIG. 17, settable material 98 is inserted into the aperture 96 in the composite sheet 93 and the areas 97 left open in the drainage member 87. The preferred manner for inserting this material 98 is by a doctoring process in which the material 98 is doctored by a doctor blade 100 into the drainage member 87 from the surface of the composite sheet 93 most remote from the drainage member 87. The doctor blade 100 creates sufficient pressure to cause the settable material 98 to flow through the apertures 96 and penetrate the open interstices in the drainage member 87. The doctor blade 100 removes substantially all residual settable material 98 from over solid portions of the exposed surface of composite sheet 93. In this manner, the height of the flow control members formed in the apertures 96 is limited to the thickness of the composite sheet 93 extending above the plane of the crests of the warp strands 88 and shute strands 90 forming drainage member 87. Where a backing layer 95 is employed, as shown in FIG. 17, the height of the projecting portion of each flow control member formed of settable material 98 is limited to the thickness of the backing layer 95. This insures that all the flow control members have a very uniform height.

The settable material 98 should intimately contact the exposed surfaces of the drainage member 87 in the areas 97 not contacted by filling material and directly beneath the apertures 96 in the superimposed composite sheet 93. As mentioned above, the thickness of the backing layer determines the height of the projecting portion 83 of the flow control members 80 being formed by the settable material 98. The portion of the settable material 98 penetrating the drainage member 87 comprises the root portion 85 of the flow control member 80 and serves to fasten the flow control member 80 to the drainage member 87 even when the drainage member 87 is flexed during operation on a papermaking machine. During the insertion of the settable material 98 into the apertures 96 in the structure shown in FIG. 16, the structure is preferably supported upon a modified surface 91, as shown in FIG. 17, in which a resilient deformable layer 99 is included. The layer 99 may be a material such as latex rubber or polyurethane foam, for example, and deforms under pressure so that portions of it extend upwardly at least partially into hollows or valleys 92 in the lower surface of drainage member 87. In other words, layer 99 tends to conform to the undulating contour of the lower surface of drainage member 87 to prevent spreading of the settable material 98 along the back surface of drainage member 87 into areas where it is not desired. Similarly, the filling material 94 in drainage member 87 prevents the flow of settable material within the drainage member 87 into areas where it is not desired, that is, into areas where drainage and fluid flow are not to be impeded.

The settable material 98 is a material capable of flow which can be fixed as by heating or curing or by chemical reaction into a fixed shape. Materials useful as settable material in the practice of this invention include thermoplastic and thermosetting resins and may be members of the class selected from the three-dimensional thermosetting resins of which the phenolic resins and the epoxy resins are illustrative examples, and the non-melting aromatic polycarbonyl derivatives of which the polyamides, polyimides, polyazines, polyoxazoles, polypyrones, etc., are illustrative examples.

Other thermoplastics useful as settable material in the process include polyolefins made from precursors such as ethylene, propylene, 1-butene, (and isomers thereof) or mixtures thereof as is well known in the art. The thermoplastic resins used as settable material must be different from the material used as filling material so that the latter can be separately removed from the drainage member, as by heat or a solvent.

Other organic resin materials may be prepared from nylons, polyesters, chlorinated polyethers, cellulose acetate, cellulose acetate butyrate, polyvinylchloride, polyisobutylmethacrylate, mineral wax, and mixtures of additives of polymers listed above. They may also comprise any of the standard accepted commerical and industrial polymers that may be cured to a stable state, whereupon they assume and maintain rigid characteristics. For example, the phenol-aldehyde resins, commonly known as the Bakelite-type resins, are satisfactory. These resins comprise those derived from a large family of phenols including phenol itself as well as the homologues of phenol such as the cresols, the xylenols, the resorcinols, the catechol, p,p'-di-hydroxy-diphenyl-2-2 propane, etc., and the reactions with aldehydes such as formaldehyde, acetaldehyde, glyoxal, acrolein, furfuraldehyde or compounds engendering aldehyde such as trioxane paraformaldehyde, hexanethylenetetramine and the like. The thermosetting epoxy resins as well as the other copolymers of epoxy resins with the phenolic resins, with the urea resins, the melamine resins, with the polyamide, with butadiene-acrylonitrile rubbers, etc. are satisfactory also and can be used as settable material in this process. Also satisfactory are the furane resins derived from furfuryl alcohol, furfuryl aldehyde or mixture of furfuraldehyde with furfuryl alcohol alone or in the presence of phenols. Some of the new high-heat resistant polymers which in their final state are infusible are particularly suitable for use in the process of this invention, such as the broad class of polybenzimidazoles of the general formula,

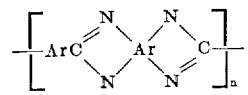

the arylene polyimides of the general formula

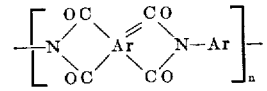

the polySchiff bases of the general formula

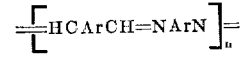

wherein Ar represents a bivalent aromatic group such as

—$C_6H_4$—, —$C_6H_4O$—C $H_4$—, —$C_6H_4$—$C_6H_4$—,
=$C_6H_4CH_2C_6H_4$—, $C_6H_4SC_6H_4$—, —$C_{10}H_6$—, etc.

Since these materials in their final state, are infusible and insoluble, they are necessarily applied to the drainage member while they are in the intermediate soluble, fusible, or soluble and fusible state, that is, uncured; thereafter cured or converted to the infusible state by any suitable means, such as by heat, catalyst or heat and catalyst.

The settable material 98 used in a given instance should be insoluble in the solvent which will be used to remove the filling material 94. Metals may be used in some instances but it is preferred to use thermosetting resins. It has been found desirable in certain instances to utilize an epoxy resin combined with rubber which possesses desirable characteristics such as flexibility which permit it to deform slightly when the drainage member 87 is flexed during use. Where the flow control members 80 extend over a large number of apertures or interstices in drainage member 87, the flexibility of the flow control members 80 becomes more important in achieving a forminous beltlike structure which will have a relatively long operating life on a papermaking machine. To facilitate the application of settable material 98 into apertures 96 and the interstices in drainage member 87, it has been found desirable to use settable material having a viscosity of between about 2500 and about 6000 poises.

The viscosity of the above-mentioned materials may be adjusted to fall within this range by the addition of thickeners, etc., such as a silica thickener. Above this viscosity range, undue pressure is required for application while, below this viscosity range, the material tends to flow too freely.

If required, the settable material 98 is then fixed in some manner depending on its composition. If it is a thermosetting resin it may be cured as by allowing it to sit or by applying heat to assist the cure. In some instances, the addition of a catalyst may be required to fix the material. Some settable materials 98 may possess properties which distinguish them sufficiently from the filling material 94 employed, and which do not require any fixing step to harden or otherwise treat them.

After the settable material 98 is affixed to drainage member 87, the filling material 94 is removed from the drainage member 87. Where a backing layer 95 is used in the composite sheet 93, it has been found possible to remove the backing layer 95 and most of the filling material layer 94 by physically separating the backing layer 95 from the drainage member 87. Any residual filling material 94 remaining on the drainage member 87 may be removed by washing the drainage member 87 in a solvent solution to dissolve the filling material 94. It is also possible to employ a filling material 94 which may be removed by the application of heat where it can be done at a temperature lower than a temperature which will degrade or alter the drainage member 87 or the settable material 98. The resulting foraminous beltlike structure comprises a drainage member 26 containing a plurality of spaced flow control members 80 secured thereto.

Where the flow control members 80 are formed with a projecting portion 83 which extends above the upper surface of the drainage member 87, it sometimes has been found difficult to remove the backing layer 95 surrounding the projecting portions 83 after their formation. This is believed to be due to adherence of some types of settable materials 98 to some types of materials used in the backing layer 95. To eliminate this problem, it has been found advantageous in these instances to treat the inside walls of the apertures 96 and in most instances the whole back surface of the backing layer 95 with a release agent before application of the settable material to prevent such bonding. One type of release agent which has been found satisfactory for this purpose is a carbowax solution which may be applied by dipping or spraying.

The pattern formed in the composite sheet 93 is the pattern which is ultimately desired in the apertured fibrous web. However, one advantage of the method of the invention is that the pattern may be altered after its formation and after the insertion of filling material 94 into the drainage member 87 as shown in FIG. 17. This may be done by masking or otherwise closing certain apertures 96 in the composite sheet 93 as by the insertion of filling material 94 into those apertures prior to the insertion of settable material 98. Thus, the fixed pattern of apertures may be varied at will in a convenient and inexpensive manner to obtain the pattern of flow control members ultimately desired.

From the above description, it will be apparent that numerous changes and modifications can be made without departing from the spirit and scope of the invention.

What is claimed is:

1. A method of preparing a foraminous belt-like structure for use in manufacturing apertured fibrous webs from a fiber furnish on a papermaking machine comprising the steps of:

forming a plurality of apertures in a predetermined pattern in a sheet of filling material, leaving solid portions between said apertures, bringing said sheet into superimposing and contacting relationship with a foraminous drainage member, applying pressure to the surface of said sheet most remote from said drainage member while supporting said member upon a backing surface so as to cause filling material from said sheet to flow into interstices in said drainage member substantially only in areas of said member in superimposing relationship with the solid portions of said sheet, leaving areas in said drainage member, corresponding to said plurality of apertures in said sheet, substantially free from filling material, inserting settable material into said apertures from the surface of said sheet most remote from said drainage member so that some of said settable material passes through said apertures and penetrates the interstices in and intimately contacts said drainage member in said areas free from filling material, lateral flow beyond the boundaries of said areas of said settable material within said drainage member being substantially prevented by said filling material within said member, and removing said filling material from said drainage member.

2. A method according to claim 1, including the step of fixing said settable material after it is inserted into said apertures and contacts said drainage member.

3. A method according to claim 1, wherein said foraminous drainage member is a woven wire cloth.

4. A method according to claim 1, wherein said sheet of filling material is a composite sheet comprising a coating of filling material on a dimensionally stable backing layer, and where said plurality of apertures is formed in a predetermined pattern through said composite sheet.

5. A method according to claim 1, including supporting said drainage member upon a resilient conformable backing surface while said sheet is pressed into contact therewith.

6. A method according to claim 1, including supporting said drainage member upon a resilient conformable backing surface while said settable material is inserted into said apertures.

7. A method according to claim 1, including the step of applying a release agent to the walls of the apertures through said sheet prior to inserting settable material into said apertures to prevent adherence of said settable material to said apertured sheet.

8. A method according to claim 1, wherein settable material is applied to substantially the entire exposed surface of said sheet most remote from said drainage member and including the step of doctoring substantially all of the settable material from the surface of the sheet thereby leaving settable material only in said apertures and in the interstices in portions of said drainage member free from filling material.

9. A method according to claim 1, wherein the step of removing said filling material includes separating said sheet from said drainage member so as to leave cured settable material in a predetermined pattern on said member in the form of impenetrable areas of said member in the image of the said predetermined pattern of apertures formed in said filling sheet, and washing said wire cloth with a solvent to remove any residual filling material remaining thereon.

10. A method according to claim 1, including the step of selectively blocking certain of said apertures in said sheet prior to insertion of said settable material therein to prevent application of settable material into areas of said drainage member corresponding to said blocked apertures.

11. A method according to claim 10, wherein said blocking is accomplished by inserting a filling material into said apertures in said sheet.

12. A method according to claim 1, including heating said sheet to soften it prior to pressing it into said drainage member.

References Cited

UNITED STATES PATENTS

| | | | |
|---|---|---|---|
| 2,816,853 | 12/1957 | Meyers | 161—114 |
| 3,034,180 | 5/1962 | Greiner et al. | 162—(ZFM) |
| 3,419,457 | 12/1968 | Bleasdale | 161—114X |
| 3,121,660 | 2/1964 | Hall, Jr. | 162—(ZFM) |

REUBEN FRIEDMAN, Primary Examiner

T. A. GRANGER, Assistant Examiner

U.S. Cl. X.R.

162—348; 264—317